Patented Dec. 2, 1930

1,783,176

UNITED STATES PATENT OFFICE

OSKAR LOEHR, OF UERDINGN (NIEDERRHEIN), GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

MANUFACTURE OF SOFT AND PLIABLE MASSES FROM CELLULOSE ESTERS

No Drawing. Application filed June 1, 1928, Serial No. 282,267, and in Germany May 7, 1926.

The invention relates to the manufacture of soft and pliable masses from cellulose esters, particularly acetyl cellulose and consists in the addition of esters of polyglycols. The simplest polyglycols are the polyethylene glycols corresponding to the general formula

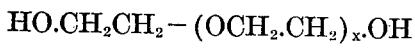

wherein X indicates any whole number and being known in their lower representatives for example:

Di ethylene glycol b. p. 245° C. at normal pressure.

Tri ethylene glycol b. p. 290° C. at normal pressure.

Tetra ethylene glycol b. p. 230° C. at 25 mm. pressure.

Penta ethylene gylcol b. p. 281° C. at 25 mm. pressure.

They and their homologues such as polypropylene glycols can be employed for carrying out my invention, or mixtures of polyglycols as are obtained by the action of mixtures of ethylene oxide, propylene oxide and the subsequent homologues upon water.

The acid used in the esterification is so selected that the resulting ester should boil within the desired limits i. e. to produce a good plasticizing agent a boiling point above about 300° C. at normal pressure is necessary. In accordance with the molecular weight of the polygylcol employed that is to say with the number of X in the above formula the boiling points of the free polyglycols vary correspondingly. Those of lower boiling point as for example diethylene glycol must be esterified with aromatic acids or aliphatic acids of high molecular weight in order to yield substances of sufficiently high boiling point, or alternatively two molecules of the original polyglycol must be combined by means of a carbonic acid residue. In the case of the polyglycols of high molecular weight as for example pentaethylene glycol esterification with acetic acid is sufficient.

The said esters especially those with aromatic carboxylic acids possess the property of giving compositions of great softness and pliability even at very low temperatures with cellulose esters particularly acetyl cellulose, which are excellently suited to the manufacture of plastic masses, lacquers, artificial leather and the like.

In the application of my invention I dissolve for example 16 parts by weight of acetyl cellulose together with 8 parts by weight of a mixture of the benzoic acid esters of a mixture of polyethylene glycols consisting essentially of diethylene glycol boiling under 15 mm. pressure from 230 to 260° and containing no free hydroxyl groups in 50 parts by weight of acetone and 20 parts by weight of cyclohexanone. The solution on pouring and evaporating the solvent yields a film of excellent properties.

The foregoing example is intended to illustrate the wide applicability of my invention, which may naturally be varied to suit individual requirements and the conditions under which the new products are to be employed.

This is a continuation in part of my copending application for U. S. Letters Patent Serial No. 189,183 filed May 5th, 1927.

I claim:

1. A new composition of matter comprising a cellulose ester and an ester of a polyglycol.

2. A new composition of matter comprising a cellulose ester and an ester of a polyglycol with an aromatic acid.

3. A new composition of matter comprising a cellulose ester and an ester of a polyethylene glycol with an aromatic carboxylic acid.

4. A new composition of matter comprising a cellulose-ester and a completely esterified polyglycol.

5. A new composition of matter comprising a cellulose ester and a dibenzoate of a polyglycol.

6. A new composition of matter comprising a cellulose ester and polyethylene glycol dibenzoate.

7. A new composition of matter comprising acetyl cellulose and polyethylene glycol dibenzoate.

8. A new composition of matter comprising acetyl cellulose and diethylene glycol dibenzoate.

9. A new composition of matter comprising acetyl cellulose, an ester of a polyglycol, a solvent therefor and a diluent.

OSKAR LOEHR.